Jan. 19, 1960     D. FRIEDMAN ET AL     2,921,472
CENTRIFUGALLY ACTUATED GYRO UNCAGING MECHANISM
Filed Sept. 15, 1954

INVENTORS
DONALD FRIEDMAN
BERNARD L. SANDBERG
BY
ATTORNEY

United States Patent Office 2,921,472
Patented Jan. 19, 1960

2,921,472

CENTRIFUGALLY ACTUATED GYRO UNCAGING MECHANISM

Donald Friedman, Oakland, and Bernard L. Sandberg, Paramus, N.J., assignors, by mesne assignments, to the United States of America as represented by the Secretary of the Navy Application September 15, 1954, Serial No. 456,347

8 Claims. (Cl. 74—5.1)

The present invention relates to gyroscopic apparatus and more particularly to a centrifugally actuated, gyro-uncaging mechanism.

In certain gyroscopically controlled apparatus, it is generally customary to lock the gyro motor mounting in a predetermined fixed position relative to the casing during the period of driving the gyro rotor to its normal operating speed and to uncage the mounting, upon the gyro rotor attaining such speed, whereby to permit the orientation of the casing relative to the rotor to vary. The present invention provides a mechanism for maintaining the gyro rotor mount caged during acceleration of the rotor to operating speed, which mechanism comprises centrifugally actuated means for effecting automatic uncaging of the gyro upon the rotor attaining its normal operating speed. While the invention is illustrated and described with reference to a gyroscope assembly of the type comprising a supporting shaft having a gyro rotor universally and rotatably mounted on one of its ends, it is to be understood that the invention may be employed with other types of gyroscope assemblies.

In accordance with the foregoing, an object of the invention is the provision of an improved uncaging mechanism for gyroscopes.

Another object of the invention is the provision of a centrifugally actuated uncaging mechanism for gyroscopes.

And a further object of the invention is the provision of an uncaging mechanism, as in the foregoing including means responsive to centrifugal force for effecting automatic uncaging of the gyro upon the rotor attaining a predetermined angular velocity.

Figure 1:
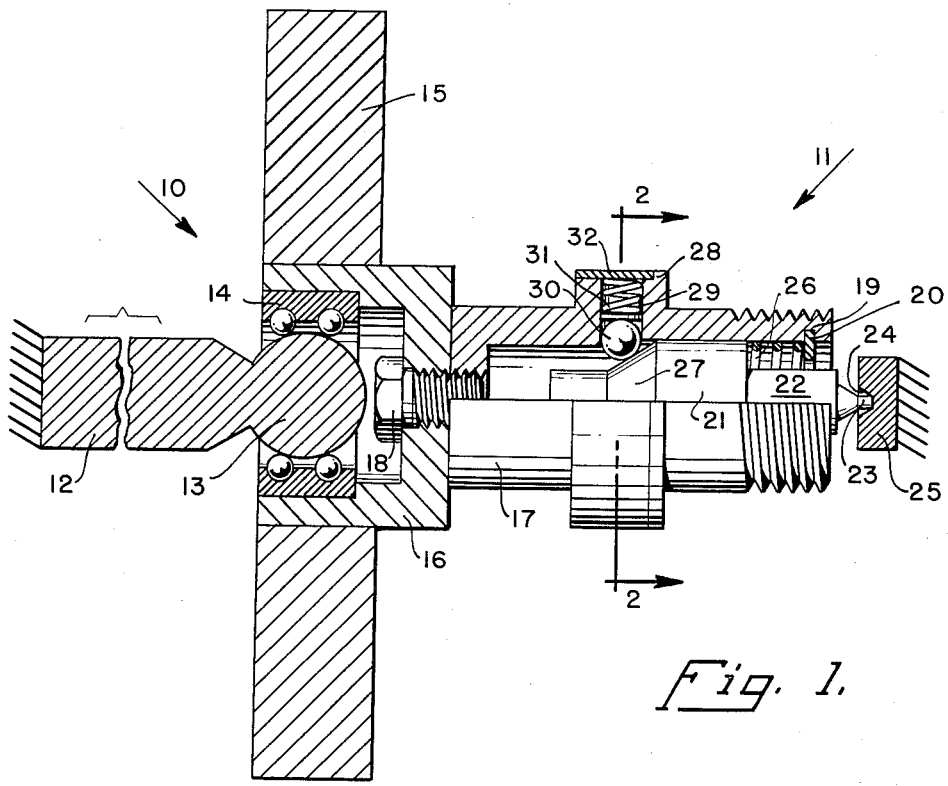
Figure 2:
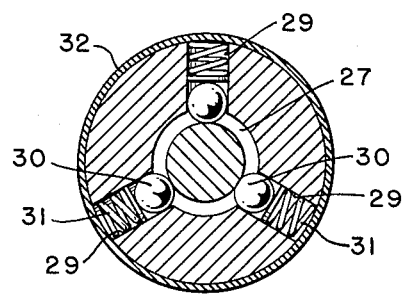

Other objects and numerous of the advantages of the present invention will become apparent as the same becomes better understood from the following detailed description had in conjunction with the annexed drawings wherein:

Fig. 1 is a longitudinal sectional view of a gyroscope assembly embodying the present uncaging mechanism; and Fig. 2 is a transverse sectional view taken along line 2—2 of Fig. 1.

Referring now to the drawings, 10 denotes generally a gyroscope assembly including a caging mechanism 11. Gyro 10 comprises a supporting shaft 12 which is fixed at one end to some supporting structure, as indicated, and has a substantially spherical surface 13 formed on its other end. Universally and rotatably mounted on said other end of shaft 12, as by means of ball bearing assembly 14 including a double ball race journaled on the spherical end 13 of the shaft, is a gyro rotor 15 including a hollow cup-shaped hub portion 16 which houses the bearing assembly 14. Caging mechanism 11 comprises a hollow, generally cup-shaped shell member 17 which is rigidly secured to the gyro rotor, for rotation therewith, as by a bolt 18 extending through and threaded to the closed end portions of hub 16 and shell 17. Adjacent the open end of shell 17 there is formed, in the inner wall of the shell, an annular groove 19 for receiving a split annular washer 20. Slidably disposed within shell 17 is a caging plunger 21 having a reduced end portion 22 extending through washer 20 and formed at its end with a substantially conical shaped projection 23. In the caged condition of the gyro, the parts are as shown, with projection 23 received in a generally conical shaped recess 24 formed in a fixed supporting structure 25. A compression spring 26 encircling the reduced end 22 of plunger 21 and abutting plunger 21 and washer 20 acts to bias the plunger to its retracted or uncaged position wherein the projection 23 is retracted from recess 24. Plunger 21 is, adjacent its other end, formed with a conical surface 27 which cooperates with centrifugally retracted detent elements, now to be described, to retain plunger 21 in its caged position shown until the rotor has been driven to a predetermined speed. Shell 17 is provided, intermediate its ends, with an enlarged portion 28 having formed therein three radially extending, equi-angularly spaced holes 29. Slidably disposed within each of the holes is a ball 30 which is urged radially inwardly, by a spring 31, into engagement with conical surface 27 whereby to prevent movement of plunger 21 to its retracted or uncaged poistion. The outer ends of holes 29 are closed by a cover sleeve 32.

In operation, the gyro is manually caged by inserting the projection 23 into the recess 24. The rotor 15 is then driven to a desired operating speed by any suitable driving means, not shown. The mass of the balls 30 and the constants of the springs 31 are made such that centrifugal force acting on the balls 30 at the desired operating speed is just sufficient to move the balls radially outwardly to a position whereat plunger 21 is permitted to move to its retracted position under the action of spring 26 whereby to uncage the gyro, the plunger moving to an axial position wherein the balls will engage the cylindrical surface thereof so that the gyro will be permanently uncaged.

Obviously, many modifications and variations of the present invention are possible in the light of the above teachings. It is therefore to be understood that within the scope of the appended claims the invention may be practiced otherwise than as specifically described herein.

What is claimed is:

1. In a gyroscopic device, a supporting structure, a gyro rotor universally and rotatably mounted on the supporting structure, means fixed to the rotor for rotation therewith and including a detent element movable along the axis of said rotor and engageable in its extended position with said structure for caging the rotor, means for biasing said element to a retracted position out of engagement with said structure, and centrifugally actuated means for maintaining said element in its extended position until said rotor attains a predetermined angular velocity, said last mentioned means being movable under the action of centrifugal force at said predetermined angular velocity to a position wherein said element is released to move to its retracted position.

2. In a gyroscopic device, a supporting structure, a gyro rotor universally and rotatably mounted on the supporting structure, a caging mechanism fixed to the rotor and comprising a detent member movable along the axis of the rotor and engageable in its extended position with said structure for caging the rotor, spring means for biasing said member to its retracted position, centrifugally actuated detent means for retaining said detent member in its extended position until the rotor has attained a predetermined angular velocity, said last mentioned means being moved to a retracted position under the action of centrifugal force at said predetermined angular velocity whereby to permit said spring means to move the detent member to its retracted position whereby to uncage the rotor.

3. In a gyroscopic device, a supporting structure, a gyro rotor universally and rotatably mounted on the structure, a caging mechanism comprising a sleeve concentrically fixed to the rotor for rotation therewith, a detent member slidable within the sleeve and engaging, in its extended position, the supporting structure for caging the rotor, spring means for biasing the detent member to its retracted position, radially movable means carried by the sleeve and normally engaging the detent member to maintain the latter in its extended position, said radially movable means being moved to a retracted position under the action of centrifugal force at a predetermined rotor speed whereby to permit said spring means to move the detent member to its retracted position.

4. Structure according to claim 3 wherein said radially movable means comprises at least one detent element, and spring means for biasing said element radially inwardly.

5. Structure according to claim 4 wherein said detent member includes an inclined surface, said detent element engaging said surface in its extended position to maintain the detent member in its extended position, said detent member further including a cylindrical surface which, in the retracted positions of the parts, is aligned with the detent element whereby the rotor will be permanently maintained in its uncaged condition.

6. Caging mechanism for gyroscopic devices of the type including a supporting structure and a gyro rotor universally and rotatably mounted on the supporting structure, comprising a detent member, means for supporting the member on the rotor for movement along the rotor axis, means for biasing said member to a retracted position toward the rotor, and centrifugally actuated means for normally retaining the member in an extended position wherein it is adapted to engage the supporting structure for caging the rotor, centrifugal force at a predetermined rotor speed acting to release said last mentioned means whereby to permit said detent member to be moved to its retracted position.

7. Caging mechanism for gyroscopic devices of the type including a supporting structure and a gyro rotor universally and rotatably mounted on the structure, comprising a support adapted to be secured to the rotor for rotation therewith, a detent member slidably carried by the support for movement along the rotor axis, spring means for biasing said member to a retracted position toward the rotor, and radially movable means carried by the support normally engaging said member to retain the latter in an extended position wherein it is adapted to engage the supporting structure for caging the rotor, said last mentioned means being movable under the action of centrifugal force at a predetermined rotor speed to a position wherein said detent member is released to be moved to a retracted position by said spring means.

8. Caging mechanism as in claim 7 wherein said means carried by said support comprises at least one detent element and spring means for biasing said element radially inwardly into engagement with said detent member.

References Cited in the file of this patent

UNITED STATES PATENTS 1,127,403  Chandler _____ Feb. 9, 1915

FOREIGN PATENTS 861,605  France _____ Feb. 13, 1941